United States Patent [19]

Suggs

[11] Patent Number: 4,539,484
[45] Date of Patent: Sep. 3, 1985

[54] WAVE AND TIDE POWERED GENERATION APPARATUS

[76] Inventor: Louis F. Suggs, Rte. 3, Antlers, Okla. 74523

[21] Appl. No.: 157,017

[22] Filed: Jun. 6, 1980

[51] Int. Cl.³ .............................................. F03B 13/12
[52] U.S. Cl. ......................................... 290/53; 74/812
[58] Field of Search ................ 290/42, 53, 54; 74/812

[56] References Cited

U.S. PATENT DOCUMENTS

| | | | |
|---|---|---|---|
| 110,436 | 12/1870 | Close. | |
| 385,327 | 6/1888 | Starkenberg. | |
| 412,841 | 10/1889 | Conklin | 74/812 |
| 446,057 | 2/1891 | Copeland | 60/504 |
| 639,733 | 12/1899 | Johnson | 60/504 |
| 639,734 | 12/1899 | Johnson | 60/504 |
| 1,083,794 | 1/1914 | Braunsdorf | 185/34 |
| 2,222,790 | 11/1940 | Van Scharrel | 290/54 |
| 2,668,918 | 2/1954 | Howell | 290/53 |
| 3,567,953 | 3/1971 | Lord | 290/42 |

Primary Examiner—Peter S. Wong
Assistant Examiner—D. L. Rebsch
Attorney, Agent, or Firm—Laney, Dougherty, Hessin, Claro & Beavers

[57] ABSTRACT

A wave and tide powered generation apparatus includes a frame which is fixed relative to the varying level of the body of water, and includes a float operably associated with the frame for movement in response to the varying level of the body of water. A rotatable drum is attached to the float and has a drive line with a middle portion wrapped around the rotatable drum. Upper and lower ends of the drive line are attached to upper and lower portions of the frame. Movement of the float upward or downward relative to the frame causes the rotatable drum to be rotated due to its engagement with the drive line. A power transfer apparatus transmits the rotary motion of the drum to a generator.

25 Claims, 2 Drawing Figures

WAVE AND TIDE POWERED GENERATION APPARATUS

BACKGROUND OF THE INVENTION

1. Field of the Invention

This invention relates generally to apparatus for generating power from wave and tidal motion of a body of water.

2. Description of the Prior Art

The prior art includes several devices having float means connected to a rotatable drum, said rotatable drum being fixedly attached to a frame which does not move with rising and falling levels of the body of water. These devices include a chain or other line means connecting the float to the rotatable drum. Such devices are shown in:

U.S. Pat. No. 110,436 to Close
U.S. Pat. No. 385,327 to Starkenberg
U.S. Pat. No. 446,057 to Copeland
U.S. Pat. No. 639,733 to Johnson
U.S. Pat. No. 639,734 to Johnson
U.S. Pat. No. 1,083,794 to Braunsdorf.

SUMMARY OF THE INVENTION

The power generation apparatus of the present invention includes a frame means, fixed relative to a varying level of a body of water. A rectangular float means is operably associated with the frame means for movement relative thereto in response to the varying level of the body of water.

First, second, third and fourth rotatable drums are attached to the rectangulat float means for movement relative to the frame. One of said drums is located at each corner of the float means. A first drive line means has upper and lower ends attached to upper and lower parts of the frame, respectively, and has a middle portion wrapped around the first rotatable drum for rotating the first rotatable drum in a first direction when the float means rises relative to the frame and in a second direction opposite the first direction when the float means descends relative to the frame. Second, third and fourth drive line means are similarly provided interconnecting the second, third and fourth drums, respectively, with the frame. The first, second, third and fourth drive line means also serve as guide line means for guiding the rising and descending motion of the float means relative to the frame.

Power transfer means is provided for transmitting the rotary motion of the first, second, third and fourth drums to a device or devices to be driven thereby.

It is, therefore, a general object of the present invention to provide an improved wave and tide powered generation apparatus.

Another object of the present invention is the provision of a wave and tide powered generation apparatus having a rotatable drum attached to a float means and movable relative to a frame and a drive line means attached to the frame.

And another object of the present invention is the provision of a drive line means which also serves as a guide line means between a float and a frame of a wave and tide powered generation apparatus.

Yet another object of the present invention is the provision of a wave and tide powered generation apparatus having a rectangular float means with a power generation apparatus located at each corner thereof.

And another object of the present invention is the provision of an improved power transfer means for transmitting rotary motion of a drum to a device to be powered thereby regardless of the direction in which the drum is rotating.

Another object of the present invention is the provision of a means for adjusting a tension in a drive line means of a wave and tide powered generation apparatus.

And another object of the present invention is the provision of a wave and tide powered generation apparatus wherein none of the moving parts thereof are located underwater.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
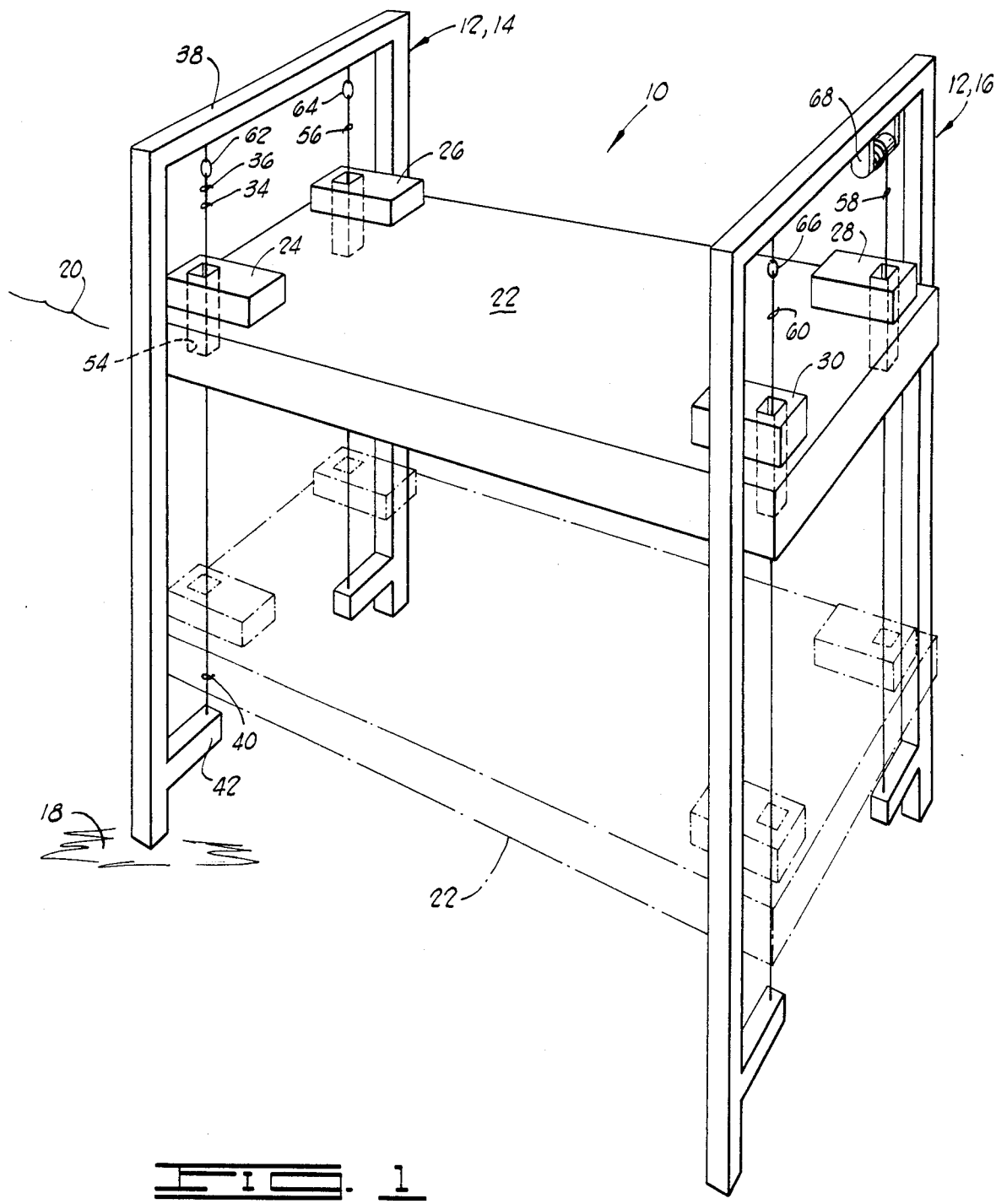
FIG. 1 is a schematic perspective view of the power generation apparatus of the present invention showing the float means in an upper position relative to the frame in solid lines, and in a lower position relative to the frame in phantom lines.

Referring now to the drawings and particularly to FIG. 1, the power generation apparatus of the present invention is shown and generally designated by the numeral 10.

The power generation apparatus 10 includes a frame means, generally designated by the numeral 12, and including first and second frame portions 14 and 16, respectively. The frame means 12 is fixed to a bottom 18 of a body of water having a varying surface level 20.

A rectangular float means 22, which is preferably a large barge, floats upon the surface 20 of the body of water, being operably associated with the frame means 12 for movement relative thereto in response to the varying level of the body of water. That is, as the level rises, the float means 22 moves upward relative to the frame 12.

The float means 22 includes first, second, third and fourth power generation assemblies 24, 26, 28 and 30, respectively, located at the corners and attached thereto. The power generation assemblies 24, 26, 28 and 30 are shown in schematic form only in FIG. 1.

Figure 2:
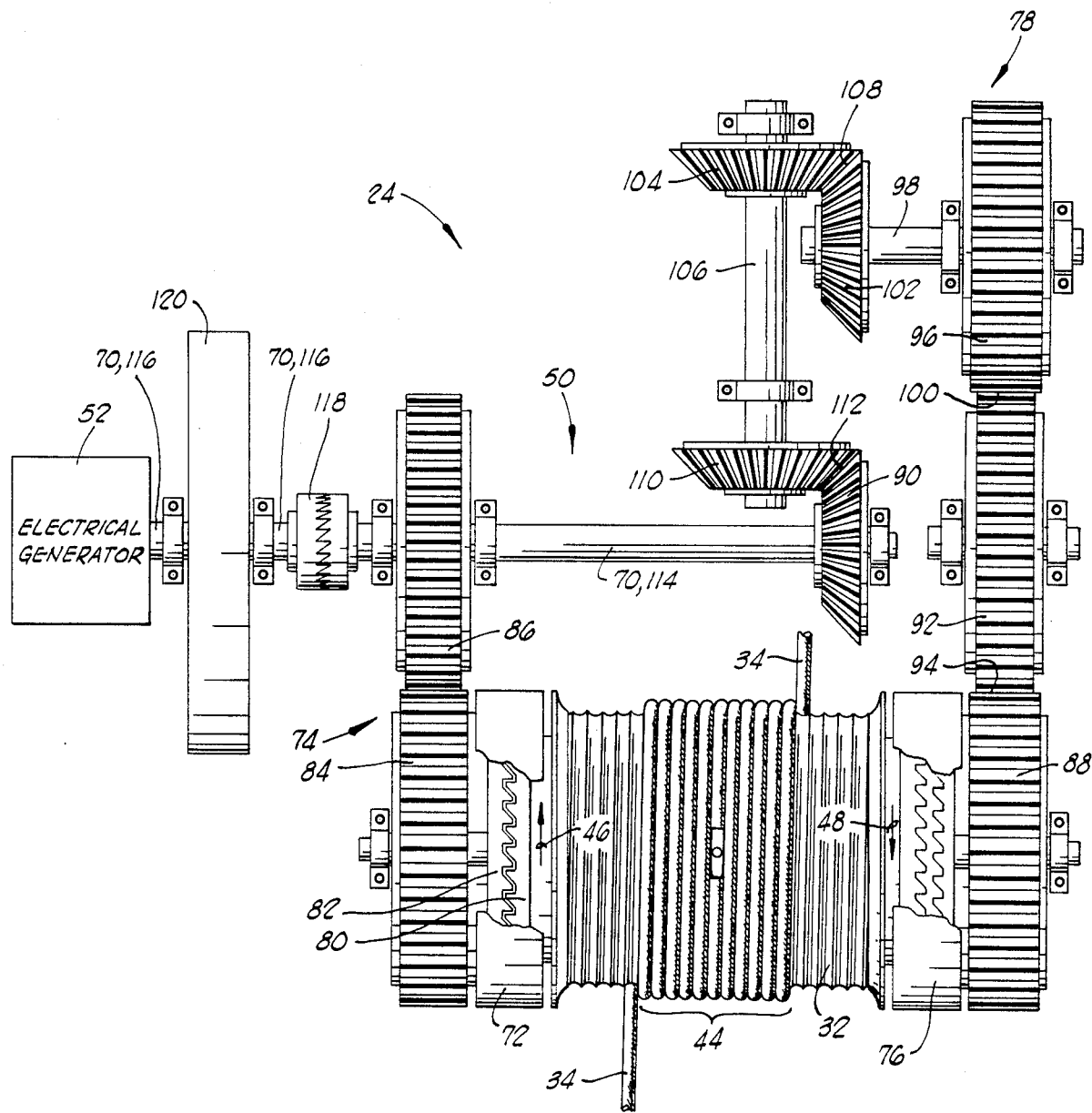
FIG. 2 is a schematic illustration of a rotatable drum of the power transfer means of the present invention.

Referring now to FIG. 2, the details of construction of the first power generation assembly 24 are there schematically illustrated.

Power generation assembly 24 includes a first rotatable drum 32 which is attached to float means 22 for movement relative to frame 12.

A first drive line means 34 has an upper end 36 attached to an upper part 38 of first frame portion 14 and includes a lower end 40 attached to a lower part 42 of first frame portion 14. First drive line means 34 further includes a middle portion 44, as shown in FIG. 2, wrapped around first rotatable drum 32.

First drive line means 34 provides means for rotating drum 32 in a first direction represented by the arrow 46 when the float means 22 rises relative to frame 12 and for rotating the drum 32 in a second direction represented by the arrow 48, opposite the first direction, when the float means 22 descends relative to the frame 12.

A power transfer means designated generally by the numeral 50 is provided for transmitting the rotary motion of the drum 32 to drive a device such as an electrical generator 52. Electrical power generated by generator 52 may be transferred to shore by a transmission cable (not shown).

As can be seen in FIG. 1, the first drive line means 34 is disposed through a vertical opening 54 in the first corner of float means 22.

Similarly, second, third and fourth drive line means 56, 58 and 60 interconnect the frame 12 with rotatable drums of the second, third and fourth power generation assemblies 26, 28 and 30, respectively.

Each of the drive line means 34, 56, 58 and 60 serves both as a means for driving the drum of its respective power generation assembly and as a guide line means for guiding the rising and descending motion of the float means 22 relative to the frame.

The first drive line means 34 has its upper end 36 attached to the frame 12 by an adjustment means 62 which is illustrated as being a turnbuckle. Second and fourth guide line means 56 and 60 are shown as being similarly connected by turnbuckle type adjustment means 64 and 66, respectively.

Third guide line means 58 is illustrated as having an alternative form of adjustment means 68 which is a powered winch to which the third guide line means 58 is attached. Generally, the same type of adjustment means is preferably used on all four guide line means, but alternative embodiments are shown together in FIG. 1 merely for ease of illustration and to prevent duplication of figures.

The adjustment means 62, 64, 66 and 68 are provided to take slack out of the respective guide line means to which they are attached, and to adjust the tension.

Referring again to FIG. 2, the power transfer means 50 includes a power shaft 70.

A first clutch means 72 is operably associated with a first end of drum 32 for driving power shaft 70 through a first gear assembly 74 when drum 32 is rotating in the first direction indicated by arrow 46, and for allowing first gear assembly 74 to rotate freely relative to drum 32 when drum 32 is rotating in the second direction indicated by arrow 48.

A second clutch means 76 is operably associated with a second end of drum 32 for driving the power shaft 70 through a second gear assembly 78 when the drum 32 is rotating the second direction indicated by the arrow 48, and for allowing second gear assembly 78 to freely rotate relative to drum 32 when drum 32 is rotating in the first direction indicated by arrow 46.

As is illustrated in FIG. 2, each of the first and second clutch assemblies 72 and 76 includes a ratchet assembly. The ratchet assembly of first clutch 72 includes a first part 80 attached to the first end of drum 32 and includes a second part 82 connected to the first gear assembly 74. The teeth of the first and second ratchet parts 80 and 82 are shown in a meshed position so that movement in the direction of the arrow 46 causes the second ratchet part 82 to be driven by the first ratchet part 80. If the drum 32 is rotated in the second direction indicated by arrow 48, the sloped portions on the teeth of ratchet parts 80 and 82 will cause those teeth to ratchet relative to each other so that first gear assembly 74 may freely rotate relative to drum 32.

Referring to the second clutch assembly 76, the teeth of the ratchet parts thereof are schematically shown in a disengaged position representing the ratcheting motion of those parts which would allow second gear assembly 78 to rotate freely relative to drum 32.

The first gear assembly 74 includes a first drive gear 84 which is directly powered from drum 32 through the first clutch means 72, and includes a first driven gear 86 which is attached to power shaft 70 and which is engaged by the drive gear 84.

The second gear assembly 78 includes a second drive gear 88 directly powered from the drum 32 through second clutch means 76 and includes a second driven gear 90 attached to power shaft 70.

Second gear assembly 78 further includes an intermediate gear means interconnecting the drive gear 88 and the driven gear 90.

The intermediate gear means between gears 88 and 90 includes a first idler gear 92 engaging drive gear 88 at a first gear meshing point 94.

A second idler gear 96 is attached to a first idler shaft 98 and is engaged with first idler gear 92 at second gear meshing point 100.

A third idler gear 102, which is a beveled gear, is also attached to first idler shaft 98.

Second gear assembly 78 further includes a fourth idler gear 104 which is attached to a second idler shaft 106, said second idler shaft 106 being oriented perpendicular to first idler shaft 98. The fourth idler gear 104 engages the third idler gear 102 at a third gear meshing point 108.

A fifth idler gear 110 is also attached to second idler shaft 106 and engages driven gear 90 at a fourth gear meshing point 112.

As indicated, there are four gear meshing points included in the intermediate gear means 78 including the gear meshing points 94 and 112 with the drive gear 78 and the driven gear 90. This even number of gear meshing points allows the power shaft 70 to be rotated in the opposite direction as the drive gear 88 when the power shaft 70 is driven by the drive gear 88.

This arrangement of the gear assemblies 74 and 78 allows the power shaft 70 to be driven in one direction by rotation of the drum 32 in either direction.

The power shaft 70 includes first and second power shaft portions 114 and 116 which are connected together at overrunning clutch 118. A flywheel 120 is attached to second portion 116 of power shaft 70 to maintain the momentum between times when the first portion 114 of power shaft 70 is transmitting power to the second portion 116 of power shaft 70.

It will be understood by those skilled in the art that the overrunning clutch 118 locks together the first and second portions 114 and 116 of power shaft 70 when the first portion 114 is being rotated as fast as the second portion 116, and overrunning clutch 118 permits the second portion 116 to freely rotate under the momentum of flywheel 120 without being retarded by the portion 114 connected to the various gearing previously described, when the force input to the first portion 114 is insufficient to turn it at the same rate of revolution as the second portion 116 of power shaft 70.

Operation of the Invention

As is apparent from the description just given, the power generation apparatus 10 of the present invention serves to provide power input to the power shaft 70 when the float means 22 is either rising or descending relative to the frame 12. The power transfer means 50 provides a means for rotating the power shaft 70 in one direction regardless of the direction in which the drum 32 is being rotated. Any motion of float means 22 relative to the frame 12 will provide a power input because such motion will cause a displacement of the rotatable drums, such as drum 32, relative to their respective drive line means such as first drive line means 34.

It is seen, therefore, that the wave and tide powered generation apparatus of the present invention readily achieves the ends and advantages mentioned as well as those inherent. While specific embodiments of the present invention have been described for the purpose of this disclosure, numerous changes in the arrangement and construction of parts may be made by those skilled in the art, which changes are encompassed within the scope and spirit of this invention as defined by the appended claims.

What is claimed is:

1. A power generation apparatus, comprising:
   a frame adapted to be fixed relative to a varying level of a body of water;
   float means operably associated with said frame for movement relative thereto in response to said varying level of said body of water;
   a rotatable drum attached to said float means for movement therewith relative to said frame;
   drive line means, having upper and lower ends attached to upper and lower parts of said frame, respectively, and having a middle portion wrapped around said rotatable drum, for rotating said drum in a first direction when said float means rises relative to said frame and for rotating said drum in a second direction opposite said first direction when said float means descends relative to said frame; and
   power transfer means for transmitting the rotary motion of said drum to a device to be driven thereby, said power transfer means including:
   a power shaft;
   first and second gear assemblies, operably associated with said power shaft;
   a first clutch means including a first ratchet, operably associated with a first end of said drum, for immediately driving said power shaft through said first gear assembly when said drum begins rotating in said first direction, and for allowing said first gear assembly to immediately freely rotate relative to said drum when said drum begins rotating in said second direction; and
   a second clutch means including a second ratchet, operably associated with a second end of said drum, for immediately driving said power shaft through said second gear assembly when said drum begins rotating in said second direction, and for allowing said second gear assembly to immediately freely rotate relative to said drum when said drum begins rotating in said first direction.

2. The apparatus of claim 1, wherein:
   said drive line means is further characterized as being a guide line means for guiding said rising and descending motion of said float means relative to said frame.

3. The apparatus of claim 1, further comprising:
   adjustment means for adjusting a tension in said drive line means.

4. The apparatus of claim 3, wherein:
   said adjustment means includes a turnbuckle.

5. The apparatus of claim 3, wherein:
   said adjustment means includes a winch.

6. The apparatus of claim 1, wherein:
   said first gear assembly includes a first drive gear directly powered from said drum through said first clutch means, and includes a first driven gear attached to said power shaft and engaged by said first drive gear.

7. The apparatus of claim 6, wherein:
   said second gear assembly includes a second drive gear directly powered from said drum through said second clutch means, a second driven gear attached to said power shaft, and an intermediate gear means interconnecting said second drive gear and second driven gear.

8. The apparatus of claim 7, wherein:
   said intermediate gear means of said second gear assembly includes an even number of gear meshing points including gear meshing points with said second drive gear and second driven gear.

9. The apparatus of claim 1, wherein:
   said second gear assembly includes a drive gear directly powered from said drum through said second clutch means, a driven gear attached to said power shaft, and an intermediate gear means interconnecting said drive gear and driven gear.

10. The apparatus of claim 9, wherein:
    said intermediate gear means of said second gear assembly includes an even number of gear meshing points including gear meshing points with said drive gear and driven gear.

11. The apparatus of claim 9, wherein said intermediate gear means of said second gear assembly includes:
    a first idler gear engaging said drive gear;
    a second idler gear engaging said first idler gear;
    a first rotating idler shaft to which said second idler gear is attached;
    a third idler gear attached to said first idler shaft, said third idler gear being a bevel gear;
    a fourth idler gear engaging said third idler gear, said fourth idler gear being a bevel gear;
    a second rotating idler shaft to which said fourth idler gear is attached, said second idler shaft being oriented perpendicular to said first idler shaft; and
    a fifth idler gear attached to said second idler shaft, said fifth idler gear being a bevel gear engaging said driven gear, said driven gear also being a bevel gear.

12. The apparatus of claim 1, wherein:
    said power shaft includes a first portion and a second portion connected through an overrunning clutch means;
    said first and second gear assemblies engage said first portion of said power shaft; and
    said apparatus further includes a flywheel means attached to said second portion of said power shaft.

13. A power generated apparatus, comprising:
    a frame means adapted to be fixed relative to a varying level of a body of water;
    rectangular float means operably associated with said frame means for movement relative thereto in response to said varying level of said body of water;
    first, second, third and fourth rotatable drums attached to said rectangular float means for movement therewith relative to said frame, one of said drums being located at each corner of said float means;

a first drive line means, having upper and lower ends attached to upper and lower parts of said frame, respectively, and having a middle portion wrapped around said first rotatable drum, for rotating said first drum in a first direction when said float means rises relative to said frame and for rotating said first drum in a second direction opposite said first direction when said float means descends relative to said frame;

a second drive line means, having upper and lower ends attached to upper and lower parts of said frame, respectively, and having a middle portion wrapped around said second rotatable drum, for rotating said second drum in a first direction when said float means rises relative to said frame and for rotating said second drum in a second direction opposite said first direction when said float means descends relative to said frame;

a third drive line means, having upper and lower ends attached to upper and lower parts of said frame, respectively, and having a middle portion wrapped around said third rotatable drum, for rotating said third drum in a first direction when said float means rises relative to said frame and for rotating said third drum in a second direction opposite said first direction when said float means descends relative to said frame;

a fourth drive line means, having upper and lower ends attached to upper and lower parts of said frame, respectively, and having a middle portion wrapped around said fourth rotatable drum, for rotating said fourth drum in a first direction when said float means rises relative to said frame and for rotating said fourth drum in a second direction opposite said first direction when said first float means descends relative to said frame;

first, second, third and fourth power transfer means for transmitting the rotary motion of said first, second, third and fourth drums, respectively, to other apparatus to be driven thereby; and wherein said first power transfer means includes:
a power shaft;
first and second gear assemblies operably associated with said power shaft;
a first clutch means, operably associated with a first end of said first drum, for driving said power shaft through said first gear assembly when said first drum is rotating in said first direction, and for allowing said first gear assembly to freely rotate relative to said first drum when said first drum is rotating in said second direction; and
a second clutch means, operably associated with a second end of said first drum, for driving said power shaft through said second gear assembly when said first drum is rotating in said second direction, and for allowing said second gear assembly to freely rotate relative to said first drum when said first drum is rotating in said first direction.

14. The apparatus of claim 13, wherein:
said first, second, third and fourth drive line means are each further characterized as being a guide line means for guiding said rising and descending motion of said float means relative to said frame.

15. The apparatus of claim 13, further comprising:
adjustment means for adjusting a tension in said first drive line means.

16. The apparatus of claim 15, wherein:
said adjustment means includes a turnbuckle.

17. The apparatus of claim 15, wherein:
said adjustment means includes a winch.

18. The apparatus of claim 13, wherein:
said first clutch means includes a ratchet.

19. The apparatus of claim 13, wherein:
said first gear assembly includes a first drive gear directly powered from said drum through said first clutch means, and includes a first driven gear attached to said power shaft and engaged by said first drive gear.

20. The apparatus of claim 19, wherein:
said second gear assembly includes a second drive gear directly powered from said first drum through said second clutch means, a second driven gear attached to said power shaft, and an intermediate gear means interconnecting said second drive gear and second driven gear.

21. The apparatus of claim 20, wherein:
said intermediate means of said second gear assembly includes an even number of gear meshing points including gear meshing points with said second drive gear and second driven gear.

22. The apparatus of claim 13, wherein:
said second gear assembly includes a drive gear directly powered from said drum through said second clutch means, a driven gear attached to said power shaft, and an intermediate gear means interconnecting said drive gear and said driven gear.

23. The apparatus of claim 22, wherein:
said intermediate gear means of said second gear assembly includes an even number of gear meshing points including gear meshing points with said drive gear and driven gear.

24. The apparatus of claim 22, wherein said intermediate gear means of said second gear assembly includes:
a first idler gear engaging said drive gear;
a second idler gear engaging said first idler gear;
a first rotating idler shaft to which said second idler gear is attached;
a third idler gear attached to said first idler shaft, said third idler gear being a bevel gear;
a fourth idler gear engaging said third idler gear, said fourth idler gear being a bevel gear;
a second rotating idler shaft to which said fourth idler gear is attached, said second idler shaft being oriented perpendicular to said first idler shaft; and
a fifth idler gear attached to said second idler shaft, said fifth idler gear being a bevel gear engaging said driven gear, said driven gear also being a bevel gear.

25. The apparatus of claim 13, wherein:
said power shaft includes a first portion and a second portion connected through an overrunning clutch means;
said first and second gear assemblies engage said first portion of said power shaft; and
said apparatus further includes a flywheel means attached to said second portion of said power shaft.

* * * * *

UNITED STATES PATENT AND TRADEMARK OFFICE
CERTIFICATE OF CORRECTION

PATENT NO. : 4,539,484
DATED : September 3, 1985
INVENTOR(S) : Louis F. Suggs

It is certified that error appears in the above-identified patent and that said Letters Patent are hereby corrected as shown below:

Abstract, line 4, after "movement" and before "in", insert
--relative thereto--; line 7, after "portion" and before
"wrapped", insert --thereof--; line 14, after "tor" and
before the period, insert --to be driven thereby--.

Column 1, line 27, delete the comma and insert --adapted to be--;
line 33, delete "rectangulat" and insert --rectangular--;
line 33, after "movement", insert --therewith--.

Column 2, line 38, after "is" and before "fixed", insert
--adapted to be--; line 42, delete the comma and insert
--and may be described as--; line 49, after "corners" and
before "and", insert --thereof--; line 57, after "movement"
and before "relative", insert --therewith--.

Column 3, line 5, delete drive"; line 6, after "52" and before
the period, insert --to be driven thereby--; line 38, after
"tension" and before the period, insert --thereof--.

Column 4, line 11, delete "asecond" and insert --a second--;
line 49, after "momentum" and before "between", insert
--thereof--.

UNITED STATES PATENT AND TRADEMARK OFFICE
CERTIFICATE OF CORRECTION

PATENT NO. : 4,539,484

DATED : September 3, 1985

INVENTOR(S) : Louis F. Suggs

It is certified that error appears in the above-identified patent and that said Letters Patent are hereby corrected as shown below:

Column 5, line 12, after "inherent" and before the period, insert --therein--.

Signed and Sealed this

Seventeenth Day of December 1985

[SEAL]

Attest:

DONALD J. QUIGG

Attesting Officer

Commissioner of Patents and Trademarks